S. T. WEBSTER.
REGENERATIVE MOTOR CONTROL SYSTEM.
APPLICATION FILED JAN. 6, 1919.

1,415,284.

Patented May 9, 1922.
4 SHEETS—SHEET 1.

Inventor:
SAMUEL T. WEBSTER,
By John H. Bruninga
His Attorney.

S. T. WEBSTER.
REGENERATIVE MOTOR CONTROL SYSTEM.
APPLICATION FILED JAN. 6, 1919.

1,415,284.

Patented May 9, 1922.
4 SHEETS—SHEET 2.

Inventor:
SAMUEL T. WEBSTER,
By John N. Bruninga
His Attorney.

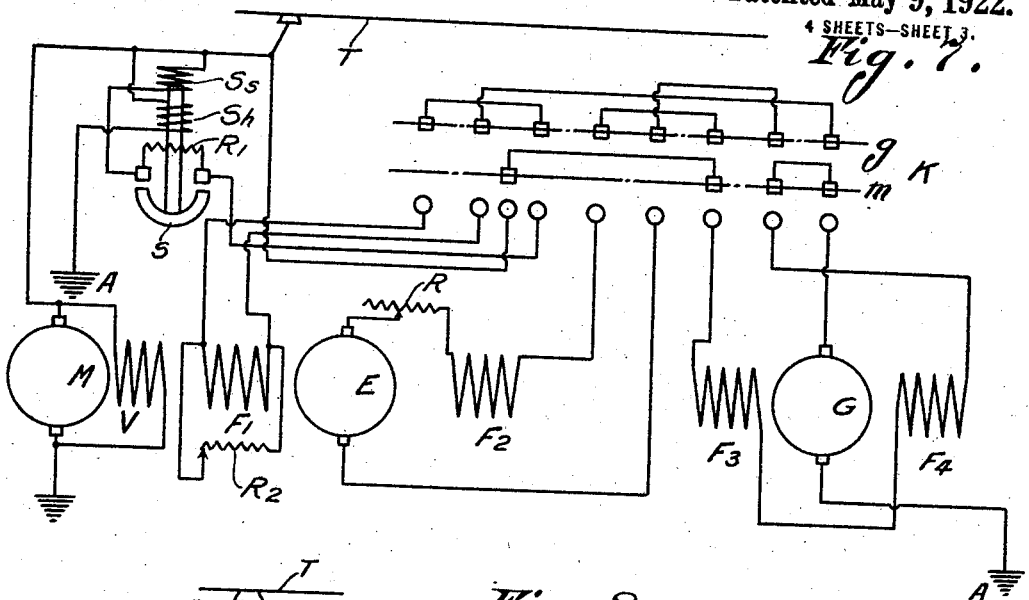
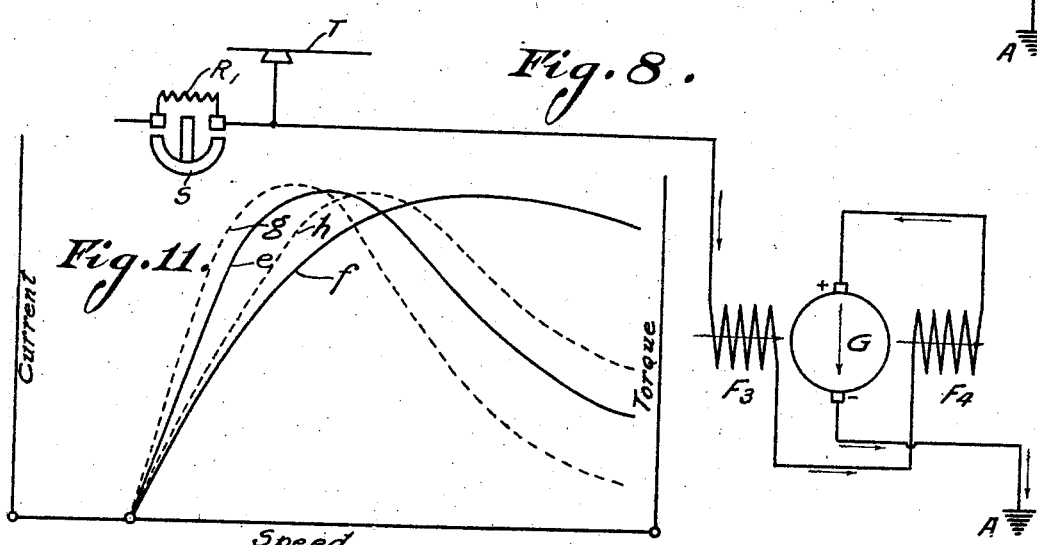
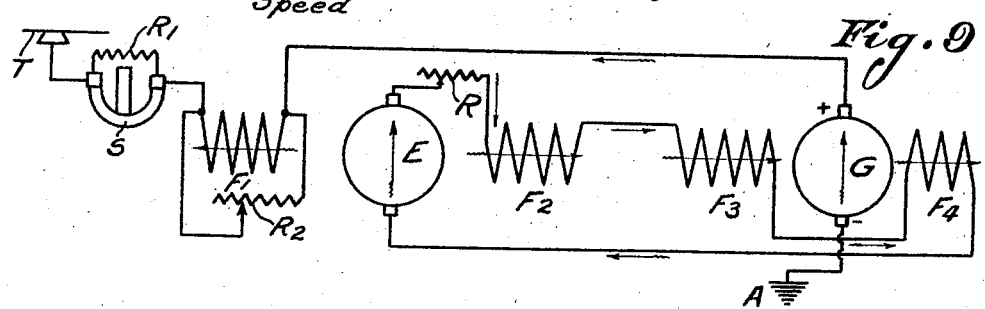

UNITED STATES PATENT OFFICE.

SAMUEL T. WEBSTER, OF ST. LOUIS, MISSOURI, ASSIGNOR, BY MESNE ASSIGNMENTS, TO GENERAL ELECTRIC COMPANY, A CORPORATION OF NEW YORK.

REGENERATIVE MOTOR-CONTROL SYSTEM.

1,415,284.  Specification of Letters Patent.  Patented May 9, 1922.

Application filed January 6, 1919. Serial No. 269,772.

*To all whom it may concern:*

Be it known that I, SAMUEL T. WEBSTER, a subject of the King of Great Britain, and residing at St. Louis, Missouri, have invented the new and useful Improvement in Regenerative Motor-Control Systems, of which the following is a specification.

This invention relates to regenerative motor control systems employing one or more motors, in which the motor or motors is or are adapted to act as a generator or generators to return energy to the line.

The use of dynamo electric machines both as motors to accelerate and drive vehicles, and also as generators to retard them by regenerating energy back to the line, is almost as old as the art itself. Several attempts have been made to combine the two functions in one machine. An analysis of the functions of motoring and generating, will enable us to specify what such a combination must be capable of doing, and the kind of characteristics the machine must have to work satisfactorily.

It would be a very desirable feature, to be able by means of a flexible gear ratio, to produce powerful driving torques during acceleration and hill climbing periods, with the least possible expenditure of current, as this not only reduces strains on the driving motors themselves, but also smooths out the peak demands on the power plant supplying the energy. This feature is to a large extent found in the standard series motor, which produces torque greater in proportion than the current used, by virtue of an increase in field strength with an increase of armature current, and this action is practically the same as a variable gear ratio, in its effect on the energy consumed.

Shunt wound motors have the opposite characteristic, as the field strength is reduced whenever the load comes on, partly on account of armature reaction, and partly on account of the reduced voltage at the motor terminals, caused by the line drop, so that in this respect, a shunt motor does not develop torque in proportion to the current used, and behaves as if it had a gear ratio which increased with increasing loads, which is a very bad feature for traction purposes, as it imposes heavy strains on all parts of the system.

On the other hand a series characteristic is very unsuitable for generating purposes, because the output of the machine is very difficult to control, on account of the increase of field strength with increase of armature current, and the machine has a tendency to overload itself. A shunt wound generator is very easily controlled by means of a regulating resistance in the field circuit. An ammeter in the main circuit is necessary to enable the operator to watch the value of the regenerated current and to keep the shunt field current adjusted at the correct value.

From the above it will be seen, that a series characteristic is good for motoring purposes, and bad for generating, and that a shunt characteristic is good for generating and bad for motoring. In order to combine the two functions in one machine, it is or has been proposed to make use of compound wound machines, but at the best this type of regenerative control is a compromise as regards the design of the motors.

One of the greatest advantages possessed by the series motor over any other type of machine for traction purposes, is its inherent and automatic field control. This feature cannot be overestimated in value, and is strongly in contrast with the non-automatic manual field control of shunt systems. A shunt wound machine in the hands of an unskilled operator is very liable to be badly damaged, and to overcome this defect, we notice in some systems using a separate motor generator for excitation purposes, that a ballast resistance is used in series with the line to take up current surges, which might be set up by a careless operator controlling the motor fields, or by variations in the line voltage itself. This non-automatic feature is very objectionable from an operating point of view, and a system which overcomes this defect should meet with approval from a maintenance standpoint.

In such systems as heretofore used, difficulty has, therefore, been experienced in regulating and controlling the value of the regenerated current or current returned to the line, thereby causing the motors to overheat or even burn out due to the excessive rise of regenerated current.

One of the objects of this invention, therefore, is to provide a system in which the value of the regenerated current will be automatically controlled and so that it cannot rise above a predetermined value, therefore by rendering the system inherently self-regulating.

Another object is to provide a system in which one or more electric motors of the simple series railway type can be used, so that the system is especially adapted to electric traction and motor vehicles for braking purposes.

Further objects will appear from the detail description taken in connection with the accompanying drawings, in which:

Figure 7 is a diagram similar to Figure 1, showing still another embodiment of this invention;

Figure 8 is a diagram showing the connections when motoring;

Figure 9 is a diagram showing the connections when regenerating;

Figures 10 and 11 are diagrams illustrating the operation;

Figure 1:
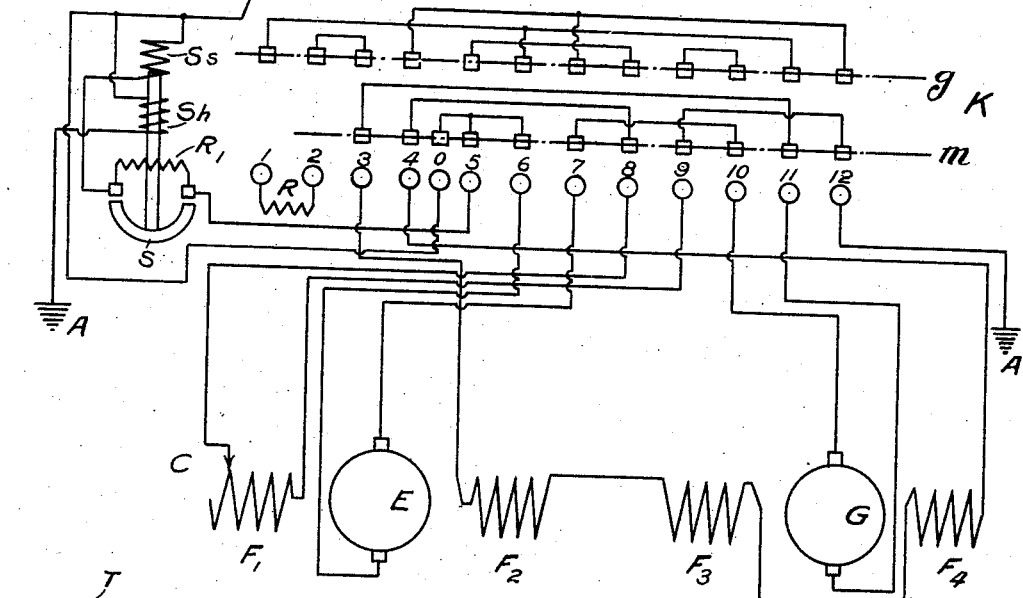
Figure 1 is a diagram showing one embodiment of this invention.

Referring to the accompanying drawings, and more particularly to Figure 1, E and G designate motors, which in this particular embodiment, are of the series, direct-current type provided with the usual armatures, and $F_1$, $F_2$ and $F_3$, $F_4$ designate the series field windings of these motors. These motors are arranged to be connected to the terminals T and A of a source of supply, shown in this case as a trolley and the ground of a railway line circuit. A suitable controller K is arranged to connect these motors, and this controller is provided with suitable contacts 0 to 12 inclusive, connected with the terminals of the line circuit, the motor field and armature windings, and with a resistance R. Suitable movable contacts are provided as usual to make the connections, $m$ being the motoring contacts, i. e., the contacts which come into operation when the machines are to be operated as motors, and $g$ the regenerating contacts, i. e., the contacts which come into operation when the machines are to be operated as generators. A steadying resistance $R_1$ is connected in the main circuit and is arranged to be short circuited by a switch $s$ having a series coil $S_s$ and a shunt coil $S_h$.

Figure 2:
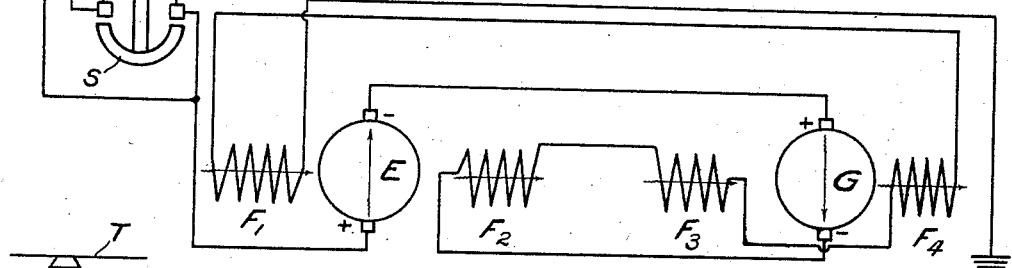
Figure 2 is a diagram showing the connections of the motors when acting as motors.

The motors E and G are in this particular instance shown as of the two-pole series, direct-current type in which N and S poles are formed as shown. When the machines are to be used as motors, the field windings and armatures may be connected in series to the terminals of the line circuit by shifting the motor contacts $m$ to position. The connections when motoring are shown in Figure 2; in this case the motors receive current from the line and operate as series motors in the usual way.

Figure 3:
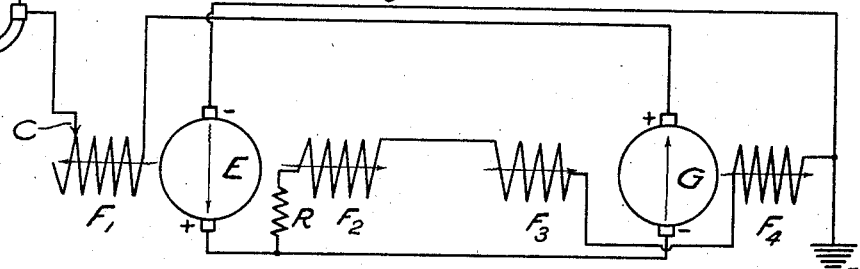
Figure 3 is a diagram showing the connections when the motors are acting as generators to return current to the line.

When the vehicle is now to be braked, the regenerating contacts $g$ of the controller are moved into position, and the connections will be made as shown in Figure 3. In this case the field coil $F_1$ of the machine E is connected in series with the armatures to the line, and the field coils $F_2$, $F_3$ and $F_4$ are connected across the armature of E. The connections are such that the line current will flow through the field coils $F_1$, $F_2$, $F_3$ and $F_4$ in the same direction as before, so that the magnetization, due to the line current flowing through the coils $F_1$ and $F_2$ will be in the same direction, i. e., $F_1$ and $F_2$ will assist each other. The machine E will thus be energized in the correct direction; thus making the system independent of residual magnetization for building up the voltage. The line current will set up a field in the machine E and cause an electromotive-force to be set up which is opposed to that of the line, and will also energize the field of machine G to set up an electro-motive force therein in the same direction as in machine E. The electromotive-force of machine E will set up a current in the field coils $F_2$, $F_3$ and $F_4$, and since the voltages of the machine E and of the line are applied to $F_2$, $F_3$ and $F_4$ in parallel, the current due to machine E will strengthen these fields. An electromotive-force will thus be set up in both the armatures of machines E and G, and due to the series connection between the machines, the voltages are added and are opposed to the line.

At a certain critical speed of the coasting vehicle, and of the machines E and G geared thereto, the sum of the voltages of machines E and G will equal that of the line and thereafter a regenerated current will be delivered to the line. It will be noted, however, that while a current from the line will flow through the field coil $F_1$ so that this field coil will assist $F_2$, when a regenerated current starts to flow, this regenerated current will flow through the coil $F_1$ in a reverse direction and its effect will therefore be to cause $F_1$ to oppose $F_2$. This furnishes automatic means for regulating, controlling and limiting the value of the regenerated current, as follows: When the combined voltages of the machines E and G rises to a predetermined point above the voltage of the line, and therefore as the current delivered to the line rises above a predetermined value, this current will in flowing through the field $F_1$ weaken the field of machine E. The weakening of the field of machine E will lower its voltage, which will decrease the current flowing through the coils $F_2$, $F_3$ and $F_4$, and therefore will not only still further weaken its own field, but will also weaken the field of G and lower its voltage. In fact the action is accumulative in a negative sense, in that the effect of an increase in the regenerated current is to weaken the field of machine E, which decreases its voltage, which being applied to its field winding still further decreases the field strength $F_2$, and therefore the voltage of E, which being applied to the field windings of machine G, reduces its voltage. In this way the voltages of machines E and G will be simultaneously and rapidly lowered. It will be seen that a small increase or decrease of regenerated current has a great accumulative effect upon the voltage, the current and upon the fields of machines E and G. In view of the multiplying effect or cumulative action that an increase of the regenerated current in $F_1$ has in lowering both the voltages of E and G, this system furnishes a means whereby an equilibrium will be quickly established.

Figure 10:
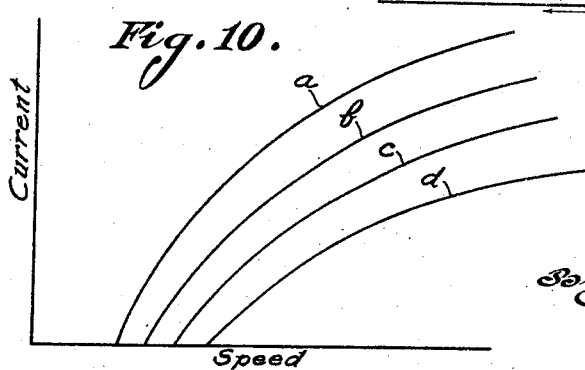

The importance of this accumulative action can be appreciated from the following: If the field winding $F_2$ would be supplied by a source of current outside of the machine E instead of being connected across its armature, then while the system would accomplish some of the objects of this invention, the system would be stable over a limited range of speed only, and in order to maintain an approximately constant current or a current not rising above a predetermined value, it would be necessary to provide a controller in circuit with the field winding $F_2$. This is illustrated by Figure 10 which shows the operation of a system as just described. In such a system, the regenerated current increases directly with the speed and there is no upper limit to this current. Accordingly, with a given resistance in circuit with a field winding $F_2$, the speed current curve will have a given shape. Thus in Figure 10, the curves $a$, $b$, $c$, and $d$ illustrate the speed current characteristics of such a system, when respectively all the resistance is cut out and when one-third, two-thirds and all of the resistance is in circuit. It will, therefore, be seen that such a system has a draw back in that, as the current increases with the increase of speed, it is necessary that the machine E be wound so that it cannot cause G to regenerate more than a certain safe value of current at a maximum speed, on account of trouble due to commutation of heavy currents at high speeds, which might cause the motor to flash over; this, however, causes the current to be too low at the average speeds; accordingly, hand regulation of machine E and its voltage is necessary over a wide speed range, so that such system cannot be said to be inherently self-regulating.

By, however, constructing the system as shown in Figures 1 to 3 inclusive, and by exciting the machine E by a field winding connected across its armature, the accumulative action above described is obtained, and accordingly the characteristics curve will be as shown in Figure 11. From this curve it will be noted that after the current rises to a predetermined value, further increase in speed will cause the current to remain not only within its limit, but that it decreases with further increase in speed, as the curve droops. It is, therefore, possible with this system to obtain the desirable feature of a high current at low speeds with an automatic tapering down, of the current at high speeds to a commutating value, without the use of any hand operated regulation at all, thereby producing in fact a thoroughly automatic system, which regulates over the whole speed range as theory requires. The curve has a rapid droop, as shown at $e$, when the field of E is stronger than its armature, while the curve has a more gradual droop, as shown at $f$, when the armature of E is stronger than its field.

Thus, the drooping characteristic of the curve shown on Fig. 11 is a function of the ratio between the number of ampere turns in the main field portion and the ampere turns in the differential field portion of the exciting motor. If the differential portion is small, the curve will not droop within the operating speeds, but if it is increased above a certain proportion, the curve will begin to droop and the regenerated amperes will actually decrease as the speed of the locomotive increases. This can be readily seen by assuming certain proportions between the main and differential field windings of the exciter. Except for armature reaction and IR drop in the line circuit the speed at constant line volts depends upon the field of the regenerating motors, since at higher speeds a weaker field is necessary to produce the same counter E. M. F. which must remain at the constant line volts. Therefore, if we assume that the main field of the exciter which is connected in series with the field of the regenerating motors is represented by 100 and if we assume that with a certain value of regenerated amperes which traverses the differential field portion, the differential field is represented by 30, then the actual effective amperes is represented by 100−30=70. At some higher speed which means necessarily a lower field value of the regenerating motors and therefore, a lower main field in the exciter, let us assume that the field has fallen to 35. Then at the same line amperes, the resultant exciter field is 35−30=5. If this is in the unsaturated portion of the regenerating motors and exciter, the increase in speed will be somewhere nearly proportional to the decrease in field amperes of the regenerating motors. The speed will then be about three times as high as at 100 field. We have, therefore, the following conditions:

An exciter which requires about one-third the original volts, since the amperes in its circuit is about one-third, but which has $\frac{5}{75}$ of the original field and three times the speed. This will give an exciter voltage of about $3 \times \frac{5}{75}$ or $\frac{15}{75}$ which is less than the $\frac{1}{3}$ original voltage necessary to furnish the required field amperes represented by 35. To establish a balance in the circuit it is, therefore, necessary to produce $\frac{1}{3}$ the original exciter volts and this can only be done by reducing the differential amperes in the exciter field, which is the regenerated amperes, since everything else is fixed, the line voltage being constant and the main field amperes being fixed by the speed. In order to get the necessary $\frac{1}{3}$ voltage on the exciter, the differential amperes will have to be reduced from 30 to 27 and then the resultant exciter field will be 35−27=8 and the exciter voltage will be $\frac{8}{75} \times 3$ or $\frac{24}{75}$ which is the necessary $\frac{1}{3}$ of the original voltage required by the exciter.

From the above it will be seen that the line amperes has decreased while the speed has increased. The explanation has been based on operating at speeds at which the motor fields are unsaturated. As the fields become more and more saturated, the effect of variations in the exciter voltage will have less effect on the total flux and therefore, this drooping characteristic will not occur until the motor fields begin to unsaturate. The saturation, therefore, determines the critical point at which the curve begins to droop.

This drooping characteristic is an important feature for the following reasons: The reactance voltage of commutation depends chiefly on the product of current and speed, and to keep this within a safe value, the higher the speed, the lower the current must be in order to keep the above product the same, otherwise, the reactance voltage will be so great at high speeds with heavy currents, as to cause a flash over. Any other system which does not produce a drooping characteristic, therefore, necessarily requires hand regulating.

The actual value of the regenerated current or the curve Figure 11 can be adjusted once and for all by regulating the ampere turns of $F_1$, for instance by cutting in and out coils by a movable contact C as shown in Figure 1 or by providing an adjustable resistance $R_2$ as shown in Figure 9 or putting resistance R in series with the field windings $F_2$, $F_3$ and $F_4$. The adjustment of ampere turns of $F_1$ rises the curve without materially altering its shape while the resistance R lowers the height of the curve. It should, of course, be understood that the resistances R and $R^2$ are not regulating resistances in the sense that they are intended to be used by the motor man for controlling the output of the system. They can be used for this purpose, if a suitable controller is provided, but they are primarily used for adjusting the system, as the regulation will be inherent without the use of any manually operated rheostats.

Another important feature of this invention is the inherent capability of having a maximum braking action at normal speeds, or even the lower speeds.

In an electric locomotive the braking effort at the traction wheel is directly proportional to the torque required to drive the armature or armatures of the motor or motors when regenerating. Therefore:

$$\text{Torque} = \frac{\text{Watts} \times \text{constant}}{\text{speed}}$$

$$= \frac{\text{Volts} \times \text{amperes} \times \text{constant}}{\text{speed}}$$

If we assume constant line voltage, then:

$$\text{Torque} = \frac{\text{Amperes}}{\text{speed}} \times \text{constant}.$$

In other words the torque is directly proportional to the regenerated current and inversely proportional to the speed.

If now we take the values of the regenerated current and speed as noted in Figure 11 by the curves $e$ and $f$, we obtain a speed torque curve $g$ corresponding to the speed-current curve $e$, and a speed-torque curve $h$ corresponding to the speed current curve $f$. We will observe, however, that while the speed-torque curve is similar in shape to its corresponding speed-current curve, the peak of the former occurs sooner than the peak of the latter, as the speed increases.

Accordingly the greatest torque and, therefore, the greatest braking effort can be at normal or even low speeds, which is so desirable for braking of locomotives. This, moreover, permits braking down to a very low speed, enabling practical elimination of other forms of braking.

At the point where the motor or motors floats or float on the line, as shown in Figure 11, the field systems are saturated and no further increase of field strength can be had.

This speed will correspond to a speed point on the acceleration curve just when all the starting resistance is cut out and the motors are drawing their heaviest motoring current.

The speed of peak current (regenerating) occurs at about double the pick up speed, when the field systems are unsaturated, and corresponds approximately to the free running speed when motoring. Thus if a locomotive is accelerated to its free running speed on the motoring connections, and the regenerative connections are made, the braking current and torque will be approximately at their maximum value.

A resistance $R_1$ is provided to temporarily limit the rush of current from the line through the low resistance path of the winding $F_1$ and of the armatures of machines G and E to the ground, which would otherwise take place at the instant of making the regenerative connections, at which time machine G is not excited. After the connections are, however, made, then machine E begins to excite, and E and G build up voltages opposed to the voltage of the line, and the resistance $R_1$ is then cut out so as to prevent waste of energy. For this purpose the switch $s$ is arranged to short circuit $R_1$ when a regenerated current starts to flow. This is accomplished as follows: The windings $S_s$ and $S_h$ of the controlling solenoid are so connected as to be in opposition when a motor current flows. As soon as a regenerated current starts to flow, this current will traverse $S_s$ in a reverse direction so that the action of $S_s$ and $S_h$ will now be in the same direction, causing the switch $s$ to be closed and the resistance $R_1$ short circuited. When motoring, the resistance $R_1$ is short circuited by the connection from the motoring contact O to the line; at this time the resistance R is also cut out.

Figure 4:
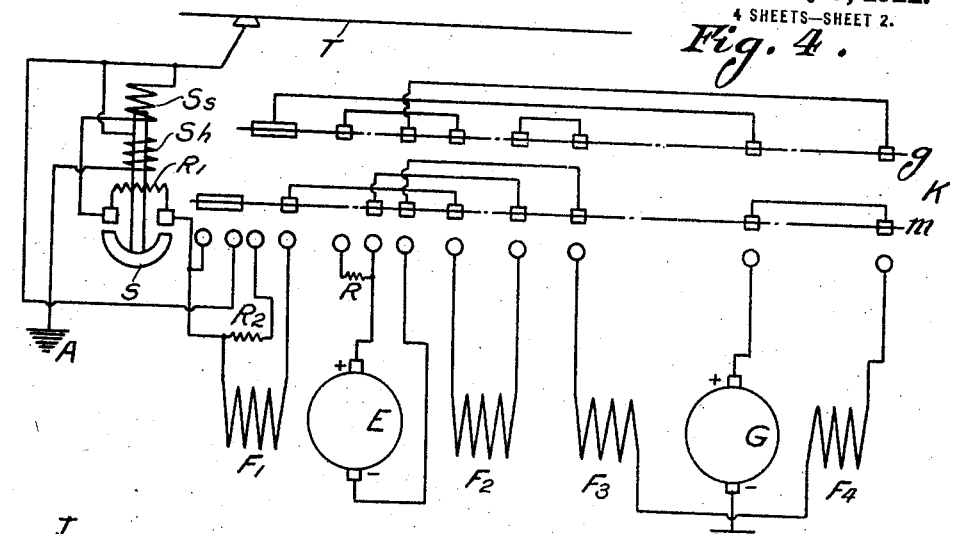
Figure 4 is a diagram similar to Figure 1, but showing another embodiment of this invention.
Figure 5:
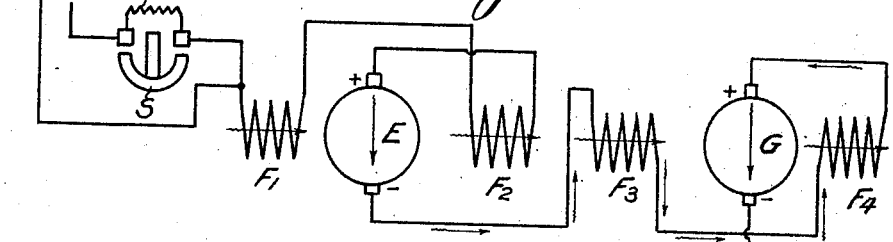
Figure 5 is a diagram showing the connections when motoring.
Figure 6:
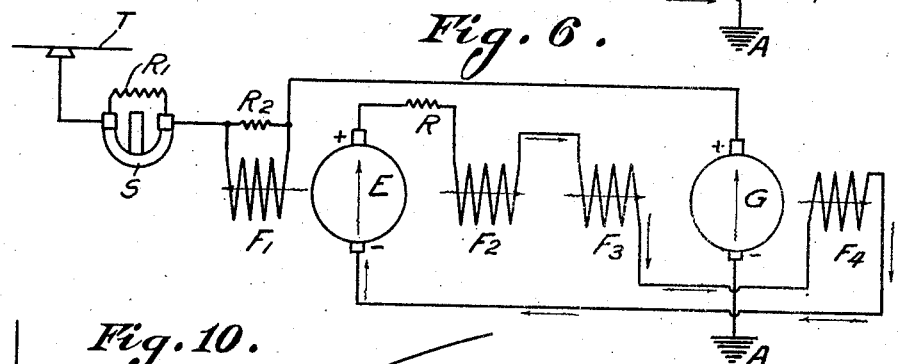
Figure 6 is a diagram showing the connections when regenerating.

In the system shown in Figures 4 to 6 inclusive, the machines E and G both operate as series motors when connected for motoring as shown in Figure 5, at which time they are connected in series as in Figure 2. When regenerating, however, the armature of the machine E is entirely disconnected from the line, and the machine E is then in fact a separate machine exciting the field of machine G. As shown in Figure 6 when regenerating, the field $F_1$ is connected in series with the armature of machine G to the line, while the field coils $F_2$, $F_3$ and $F_4$ are connected in series across the armature of machine E. It will be readily seen that the action of this system is, however, in general substantially the same as that of Figures 1 to 3 inclusive; in this case however the machine G furnishes the entire regenerated current while the machine E at this time acts simply as an exciter. While the speed-current characteristic will be substantially as shown in Figure 11, it cannot be used to regenerate down to as low a speed as in the system shown in Figures 1 to 3 inclusive, on account of the series connections of the armatures in the latter.

In the system shown in Figures 7 to 9 inclusive, the machine E is an ordinary exciter which may be driven at a constant speed as by the usual shunt motor M connected across the line and having the usual shunt winding V so that the machines E and M will form a motor regenerator set. When motoring the motor G is connected to the line to operate as an ordinary series motor as shown in Figure 8, at which time the exciter E will be entirely disconnected, it will, of course, be understood that the motor G may be one of a number of motors connected in the usual manner.

When regenerating the exciter E is connected with its field winding $F_2$ and with the field windings $F_3$ and $F_4$ across its armature and with its field winding $F_1$ in series with a line and with the armature of the machine G. The operation of this system will, therefore, be substantially the same as the system shown in Figures 4 to 6 inclusive and also generally the same as that shown in Figures 1 to 3 inclusive. In this case also the machine G furnishes the entire regenerated current. The speed-current characteristic will, however, be substantially the same as shown in Figure 11.

Figure 12:
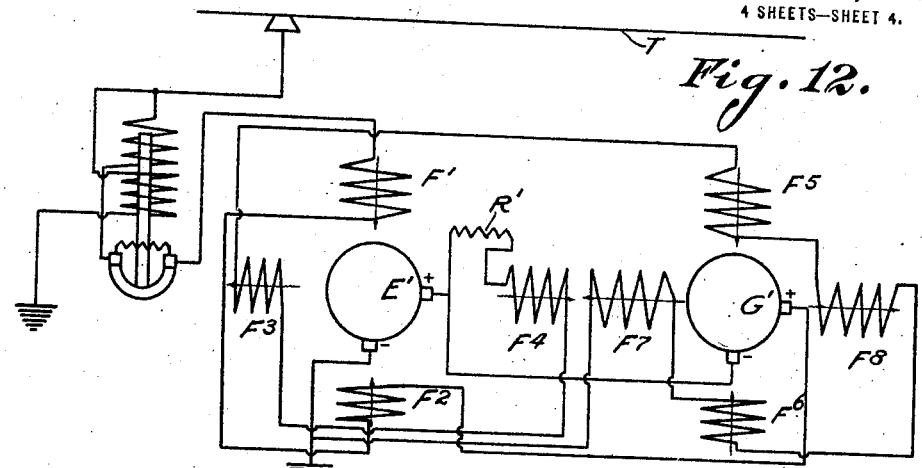
Figure 12 is a diagram of multipolar system, showing the connections when regenerating.

This invention is applicable to multi-polar motors, thus Figure 12 shows a diagram of connections of two four-pole series motors of the railway type. The controller connections have in this case been omitted and only the connections for regenerative operation have been shown. In this case the machine E' is provided with four field pole windings $F^1$, $F^2$, $F^3$, and $F^4$, and the machine G' with four windings $F^5$, $F^6$, $F^7$, and $F^8$. During regenerative operation F' and $F^2$ are connected in series with the armatures of machines E' and G' to the line, and the field windings $F^3$, $F^4$, $F^5$, $F^6$, $F^7$, and $F^8$ are connected in series with a resistance R' across the armature of the machine E'. The connections are similar to those shown in Figure 3 and are such that F' and $F^2$ will assist $F^3$ and $F^4$ when a motor current flows in the circuit, and will oppose $F^3$ and $F^4$ when a regenerated current flows. The action of the system in its automatic control will therefore be similar to that shown in Figures 1 to 3 inclusive, and further description will therefore be unnecessary. It will be understood that F' and $F^2$ can be similarly controlled as $F_1$ in Figure 1.

Figure 13:
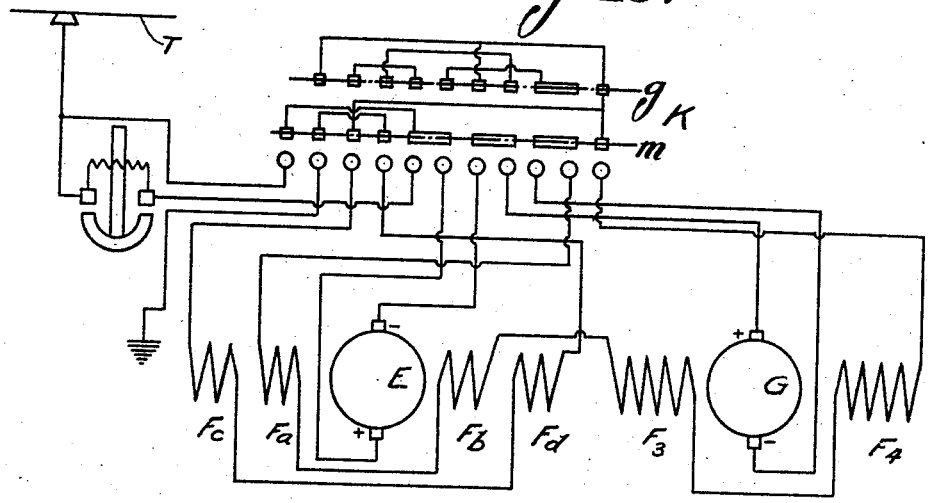
Figure 13 is a diagram similar to Figure 1, but still showing another embodiment of this invention.

In the systems shown in Figures 1 to 8 inclusive, the controlling field winding $F_1$ forms one of the pole windings of the motor, and in Figure 12 the winding is on poles of the same polarity. It is possible however to arrange the windings so that the controlling winding will be placed on all poles or on opposite poles. Such a system is shown in Figure 13 in which E and G are two-pole machines. The machine G is of the same construction as in Figure 1. The poles of the machine E are provided with two windings, namely a winding $F_a$, $F_b$ and a winding $F_c$, $F_d$, each winding having half the number of turns as the normal series winding. When the machines are operating as motors, all the windings on E are connected in series so that $F_a$, $F_b$, and $F_c$, $F_d$ will assist each other, forming in fact a simple series winding. When the machines are connected for regenerative operation, the winding $F_a$, $F_b$ is connected in series with $F_3$ and $F_4$ across the armature of E, while the winding $F_c$ and $F_d$ is connected in series with the armature to the line as in Figures 1 to 3 inclusive. The connections are made so that the winding $F_c$, $F_d$ will assist $F_a$, $F_b$ when a motor current flows through the machines, and therefore winding $F_c$, $F_d$ will oppose $F_a$, $F_b$ when a regenerated current is delivered to the line. The operation is therefore similar to the system shown in Figures 1 to 3 inclusive.

It will, therefore, be seen that this invention provides a system in which energy can be returned to the line, as in traction work, for braking the car electrically when going down grade or when decelerating. The value of the current will be automatically controlled and limited so that it cannot rise above a dangerous value, and the value of the current so automatically limited can be adjusted as desired. The controlling action is especially rapid and effective where a number of machines are used and in which one machine controls the other, in view of the multiplying or negative accumulative effect of an increase of the delivered regenerated current upon the voltage of both machines. This causes a point of stability to be quickly reached. With this system it is not necessary to use a resistance which is gradually cut out as the speed drops, or gradually cut in as the speed rises, as the control is entirely automatic, since a fixed limit is established for the regenerated current beyond which it cannot rise. The system is, therefore, absolutely "fool-proof" and the motorman or engineer is not required to carefully watch a meter, and cut in resistance when the value of the regenerated current rises above a predetermined value. Furthermore the value of the regenerated current is not only limited, but maintained, i. e., the connections are not broken when a certain value is passed. The motors when operating as generators are as inherently self regulating as two simple series motors.

It it possible to use this system with ordinary simple series motors of the railway type so that the advantages of the series motors, as distinguished from a shunt or compound motor, can be retained, and in fact present traction systems can easily be altered by the addition of a suitable controller, in view of the fact that the series windings themselves may remain unaltered. The system does not interfere with the ordinary multiple unit or series parallel control of motors and may readily be used in connection therewith.

This invention, therefore, provides a system which has the necessary features, namely: a series characteristic for motoring purposes; automatic controlling when regenerating in order to avoid current surges inherent to shunt control; and simplicity, cheapness and applicability to existing installations.

The use of standard series motors gives, of course, series characteristic for motoring purposes. By means of suitable connections between two or more electric machines of the series type which may be the car motors themselves, an inherent self-regulating speed current curve is imparted to the system when regulating and renders any kind of regulating resistance unnecessary. This speed current curve is as inherently self-regulated during regeneration as a series motor is inherently self-regulating in terms of speed and current when motoring. The characteristic of the system is such that variations in the line voltage are not followed by heavy surges in current, but by similar variations in current; that is to say, the tendency at any particular speed is for the current to increase and decrease with increases and decreases of the line voltage. This is very similar to a series motor; the current increases with a sudden jump in the voltage and decreases with a sudden drop, but does not surge like it would in a shunt controlled motor.

Figure 14:
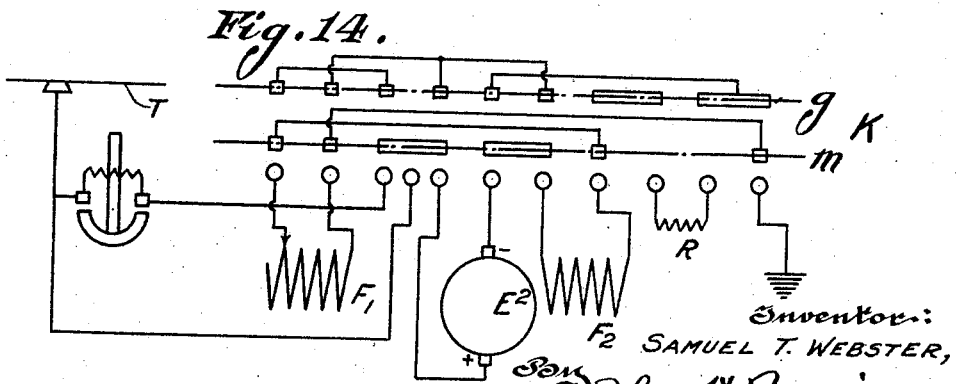
Figure 14 is a diagram showing a single motor, together with a controller, adapted to cause the motor to act as a generator.

Figure 14 shows a system employing a series motor $E^2$ adapted to operate as a generator and return current to the line, and provided with a controller K having motoring contacts $m$ and regenerating contacts $q$. When the machine $E^2$ is operating as a motor, the series field windings $F_1$ and $F_2$ are connected in series with the armature to the line as usual. When, however, the machine is operating as a generator to return energy to the line, then the winding $F_2$ is connected in series with the resistance R across the armature, while $F_1$ is connected in series with the armature to the line. The connections are such that $F_1$ and $F_2$ will assist each other when a motor current traverses the circuit, while $F_1$ will oppose $F_2$ when a regenerated current is fed back to the line. It will of course be understood that the ampere turns $F_2$ will preponderate at all times. It will further be understood that the machine $E^2$ may be one of a series of motors used in the ordinary locomotives or railway cars.

With this system the regenerated current is controlled, but only within certain limits, as the characteristic curves will be as shown in Figure 10, and not as shown in Figure 11. Accordingly, this system requires hand regulation and does not keep the regenerated current within a predetermined limit and is accordingly not stable as the system heretofore described.

It is obvious that various changes may be made in details of construction and manipulation of this system within the scope of the appended claims, without departing from the spirit of this invention; it is, therefore, to be understood that this invention is not to be limited to the details described and shown.

Having thus described the invention, what is claimed is:

1. In a regenerative control system, the combination with a line circuit, and a series motor having an armature and field windings, adapted to act as a braking generator, and adapted for connection to said line circuit to receive current therefrom and operate as a motor, of a source of current, means for connecting the armature of said motor to said line circuit and the field windings thereof to said source of current, adapted to cause said motor to act as a generator and return current to said line circuit, and means cooperating with said source of current, adapted to decrease the value of the regenerated current as the speed of said motor increases.

2. In a regenerative control system, the combination with a line circuit, and a series motor having an armature and field windings, adapted to act as a braking generator, and adapted for connection to said line circuit to receive current therefrom and operate as a motor, of a source of current, means for connecting the armature of said motor to said line circuit to cause said motor to act as a generator and return current to said line circuit, and means cooperating with said source of current, adapted to limit the value of the regenerated current, and thereafter decrease the value of the regenerated current upon further increase of the speed of said motor.

3. In a regenerative control system, the combination with a line circuit, and a series motor having an armature and field windings, adapted to act as a braking generator, and adapted for connection to said line circuit to receive current therefrom and operate as a motor, of means for connecting said motor to said line circuit, adapted to cause said motor to act as a generator and return current to said line circuit, and means cooperating with said motor, adapted to limit the flow of the regenerated current, and thereafter decrease the value of the regenerated current upon further increase of the speed of said motor.

4. In a regenerative control system, the combination with a line circuit, of a plurality of series motors having armatures and field windings and adapted to act as generators, means for connecting said motors with said line circuit to receive current therefrom and act as motors, means for connecting the armature of one of said motors to said line circuit and the field windings thereof to another of said motors, adapted to cause the first motor to act as a braking generator and return current to said line circuit, and means cooperating with said second motor, adapted to decrease the value of the regenerated current as the speed of said motor increases.

5. In a regenerative control system, the combination with a line circuit, of a plurality of series motors having armatures and field windings and adapted to act as generators, means for connecting said motors with said line circuit to receive current therefrom and act as motors, means for connecting the armature of one of said motors, to said line circuit and the field winding thereof to another of said motors, adapted to cause said first motor to act as a braking generator and return current to said line circuit, and means cooperating with said second motor, adapted to limit the value of the regenerated current, and thereafter decrease the value of the regenerated current upon further increase of the speed of said first motor.

6. In a regenerative control system, the combination with a line circuit, and a series motor having an armature and field windings, adapted to act as a braking generator, and adapted for connection to said line circuit to receive current therefrom and operate as a motor, of means for connecting said motor to said line circuit, adapted to cause said motor to act as a generator and return said motor to said line circuit, and an exciter current for energizing the field windings of said motor, adapted to supply an excitation for the said motor to cause the same to deliver maximum regenerated current at normal speeds of said motor.

7. In a regenerative control system, the combination with a line circuit, and a series motor having an armature and field windings, adapted to act as a braking generator, and adapted for connection to said line circuit to receive current therefrom and operate as a motor, of means for connecting said motor to said line circuit, adapted to cause said motor to act as a generator and return current to said line circuit, and an exciter for energizing the field windings of said motor, the said exciter adapted to supply an excitation for the said motor to cause the same to deliver regenerated current, decreasing, above-normal speeds, in accordance with the speed of said motor.

8. In a regenerative control system in which a motor is adapted to operate either as a motor when receiving current from a line circuit, or as a braking generator to return current to the line circuit, characterized by the fact that an exciter is provided for energizing the field windings of said motor, the said exciter having field windings connected with respect to its armature to cause the motor to deliver maximum regenerated current at normal speeds.

9. In a regenerative control system in which a motor is adapted to operate either as a motor when receiving current from a line circuit, or as a braking generator to return current to the line circuit, characterized by the fact that an exciter is provided for energizing the field windings of said motor, the said exciter having field windings to supply an excitation therefor which varies in accordance with the current in the said field windings of the motor and in accordance with the regenerated current, adapted to cause the motor to deliver regenerated current decreasing above normal speeds in accordance with the speed.

10. In a regenerative control system in which a motor is adapted to operate either as a motor when receiving current from a circuit, or as a braking generator to return current to the line circuit, characterized by the fact that an exciter is provided for energizing the field windings of said motor, the said exciter having a field winding energized responsively to the current in the exciter armature circuit and a differential field winding energized responsively to the regenerated current adapted to cause the motor to deliver regenerated current whose value decreases automatically when the speed rises above a predetermined value.

In testimony whereof I affix my signature this 16th day of November, 1918.

SAMUEL T. WEBSTER.